M. LISSMAN.
SPEED REDUCTION GEARING.
APPLICATION FILED NOV. 6, 1918.
1,376,954.
Patented May 3, 1921.
2 SHEETS—SHEET 2.
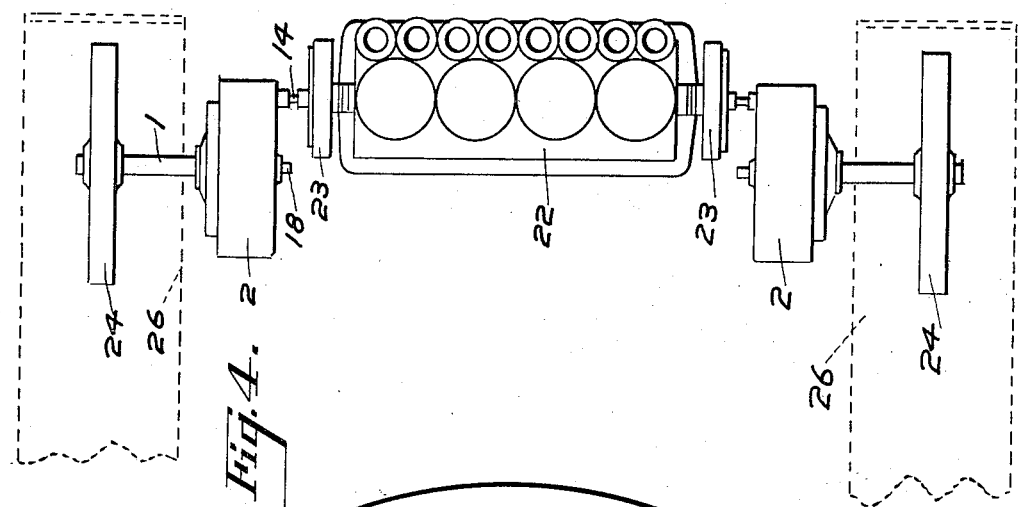
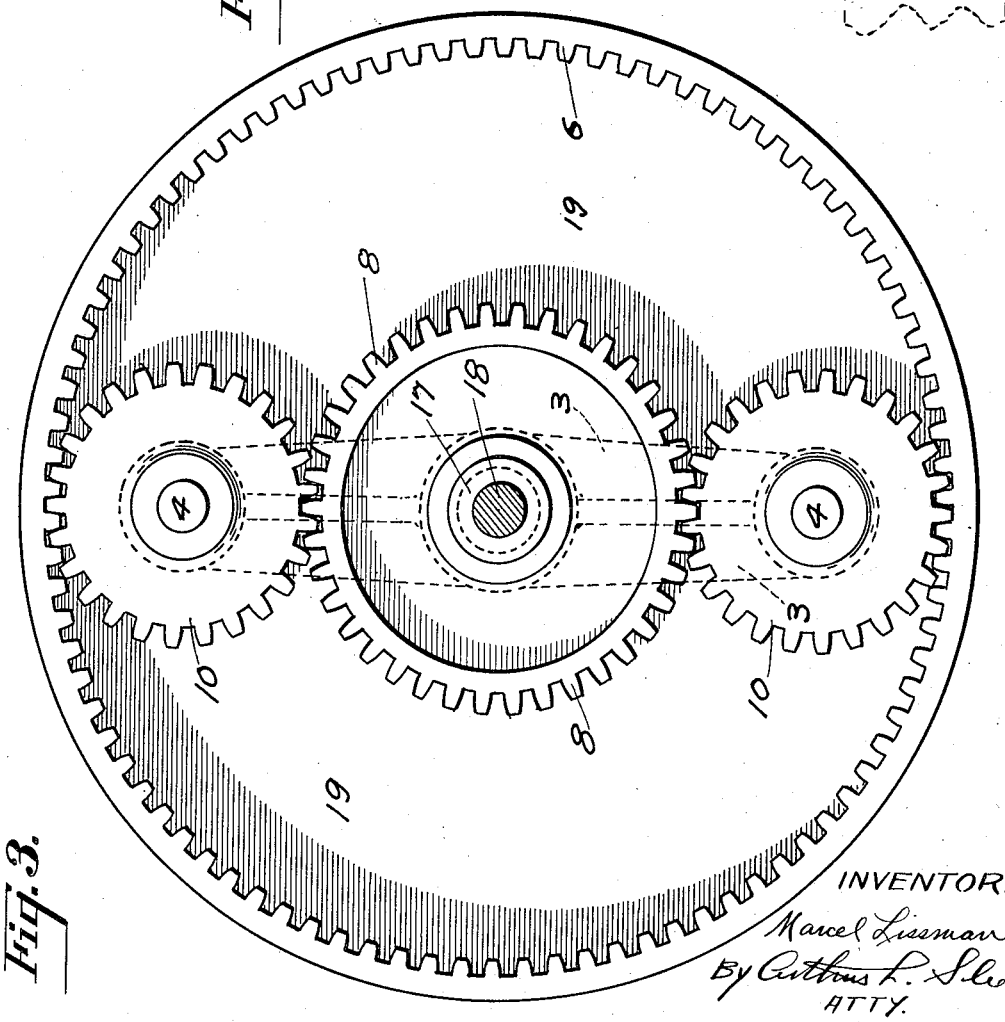
INVENTOR.
Marcel Lissman
By Arthur L. Sle
ATTY.

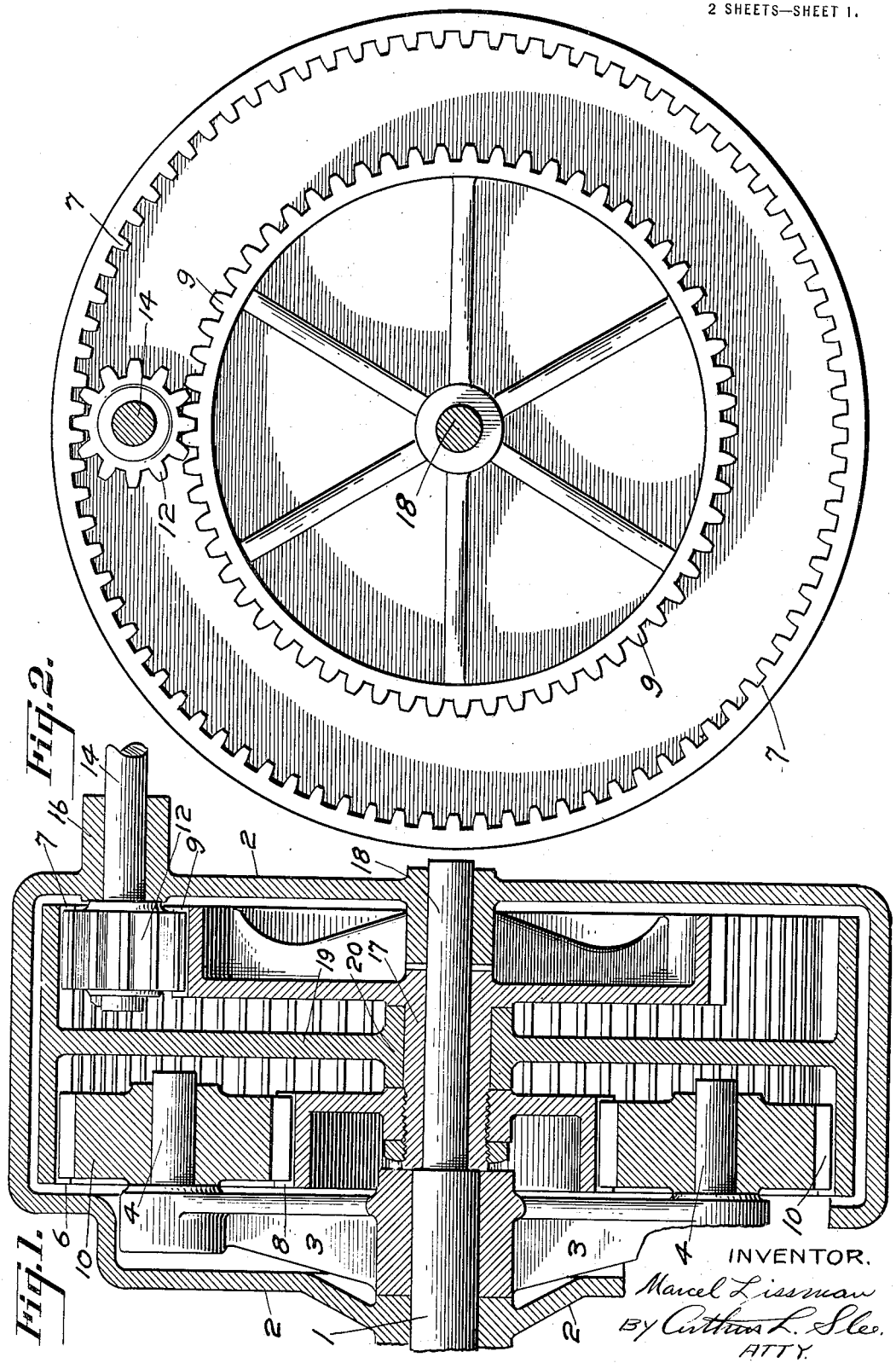

UNITED STATES PATENT OFFICE.

MARCEL LISSMAN, OF SACRAMENTO, CALIFORNIA.

SPEED-REDUCTION GEARING.

1,376,954.　　　　　Specification of Letters Patent.　　Patented May 3, 1921.

Application filed November 6, 1918. Serial No. 262,263.

*To all whom it may concern:*

Be it known that I, MARCEL LISSMAN, a citizen of the Republic of France, residing at Sacramento, in the county of Sacramento and State of California, have invented a certain new and useful Improvement in a Speed-Reduction Gearing, of which the following is a specification.

My invention relates to improvements in speed reduction gearings wherein gears operate in conjunction to reduce the speed and thereby increase the power as delivered to a driven shaft.

The primary object of the invention is to provide a new and improved reduction gearing having a simple and compact arrangement whereby a considerably great reduction of speed may be obtained with a corresponding increase in power.

It is also an object of the invention to provide improved means for applying power to both sides of a driven shaft to provide a more even turning moment and thereby reduce friction and increase the efficiency of the reduction gearing.

A further object of the present invention is to provide improved means for providing a great reduction in speed without the use of gears of excessive diameter.

I accomplish these and other objects by means of the device disclosed in the drawings forming a part of the present specification wherein like characters of reference are used to designate similar parts throughout the said specification and drawings, and in which—

Figure 1 is a vertical sectional view of my improved device;

Fig. 2 is a side elevation of one side of the gearing with the housing removed;

Fig. 3 is a view of the other side of the gearing, also with the housing removed; and Fig. 4 is a diagrammatic view disclosing one method of application of my device to a tractor.

Referring to the drawings the numeral 1 is used to designate a driven shaft rotatably mounted within a suitable housing 2 and provided with a yoke 3 extending laterally on both sides of the shaft 1, and provided with suitable pins 4.

A pair of connected internal gears 6 and 7 of the same diameter are rotatably mounted within the housing and concentric with the driven shaft 1.

A pair of connected spur gears 8 and 9 of different diameters are also rotatably mounted concentric with the driven shaft 1 and inside of the internal gears 6 and 7 respectively.

A pair of diametrically opposed pinions 10 are rotatably mounted upon the pins 4 on the yoke 3 attached to the driven shaft 1 and mesh with the smaller spur gear 8 and its respective internal gear 6.

A spur gear 8 and its respective internal gear 6 are rotated in opposite directions at different peripheral speeds by means of a driving pinion 12 which meshes with the larger spur gear 9 and its respective internal gear 7, said pinion being secured to the end of a driving shaft 14 rotatably mounted within a suitable bearing 16 in the housing 2.

The spur gears 8 and 9 are connected by means of a suitable sleeve 17 rotatably mounted upon a reduced portion of the driven shaft 1 while the internal gears 6 and 7 are carried by a suitable web or disk 19 having a suitable bearing 20 rotatably mounted upon the sleeve 17 of the spur gears 8 and 9.

In operation the driving pinion 12 rotates the spur gear 9 and its respective internal gear 7 in opposite directions and at the same peripheral speed.

It is obvious, then, that while the internal gear 6, being of the same diameter and connected to the internal gear 7, will rotate at the same peripheral speed as the gear 7, the spur gear 8, being of smaller diameter and connected to the spur gear 9 will have a slower peripheral speed than that of the said spur gear 9.

The pinions 10 being of larger diameter than the pinion 12 and driven from a spur gear 8 of smaller diameter than the spur gear 9 driven by the said pinion 12, it is evident that the said pinions 10 would be rotated at a speed much slower than the speed of the pinion 12 even were the internal gear 6 held stationary.

But as the internal gear 6 is rotated in an opposite direction from that of the spur gear 8 driving the pinions 10 it is evident that the revolutions of the pinions 10 around the axis of the driven shaft 1 will be further retarded or lessened.

It is also obvious that by providing the diametrically opposed pinions 10 on opposite sides of the shaft 1 that I have provided a more even turning moment to the shaft 1 as it is the yoke 3 which actually rotates said shaft, said yoke being in turn rotated by the gears and in the manner hereinbefore described.

Thus I have provided an improved gear reduction wherein a reduction of speed is obtained with a corresponding increase in power.

The invention is particularly adapted to be used in connection with tractors where great power and slow speed are required.

In Fig. 4 I have disclosed diagrammatically a motor 22 provided with the usual clutches 23 connecting the power or driving shaft of said motor 22 with the driving shafts 14 of the driving pinions 12.

The driven shafts 1 are provided with suitable driving wheels 24 to operate any suitable form of tractors indicated in dotted lines at 26.

Having thus described my invention, what I claim as new and desire to secure by Letters Patent is—

A speed reduction gearing comprising a driven shaft; a pair of connected internal gears of the same diameter rotatably mounted concentric with the shaft; a pair of connected spur gears of different diameters rotatably mounted within and concentric with the internal gears; a yoke secured to the driven shaft and extending laterally therefrom, a pair of diametrically opposed pinions rotatably mounted upon the ends of the yoke and meshing with the smaller spur and its respective internal gear; and a driving pinion meshing with the larger spur and its respective internal gear to rotate said last mentioned gears in opposite directions at the same peripheral speeds, and the smaller spur and its respective internal gear in opposite directions at different peripheral speeds.

In witness whereof, I hereunto set my signature.

MARCEL LISSMAN.